(12) United States Patent
Ordo

(10) Patent No.: US 12,157,441 B2
(45) Date of Patent: Dec. 3, 2024

(54) VEHICLE WASH REVERSE OSMOSIS SYSTEM

(71) Applicant: James Patrick Ordo, Avon, IN (US)

(72) Inventor: James Patrick Ordo, Avon, IN (US)

(*) Notice: Subject to any disclaimer, the term of this patent is extended or adjusted under 35 U.S.C. 154(b) by 357 days.

(21) Appl. No.: 17/500,482

(22) Filed: Oct. 13, 2021

(65) Prior Publication Data

US 2022/0118954 A1 Apr. 21, 2022

Related U.S. Application Data

(60) Provisional application No. 63/092,749, filed on Oct. 16, 2020.

(51) Int. Cl.

| | | |
|---|---|---|
| *B60S 3/04* | (2006.01) | |
| *B01D 61/02* | (2006.01) | |
| *B01D 61/08* | (2006.01) | |
| *B01D 61/12* | (2006.01) | |
| *B08B 3/04* | (2006.01) | |
| *B08B 3/14* | (2006.01) | |
| *C02F 1/00* | (2023.01) | |
| *C02F 1/44* | (2023.01) | |
| *C02F 103/44* | (2006.01) | |

(52) U.S. Cl.
CPC .............. *B60S 3/04* (2013.01); *B01D 61/025* (2013.01); *B01D 61/08* (2013.01); *B01D 61/12* (2013.01); *B08B 3/041* (2013.01); *B08B 3/14* (2013.01); *C02F 1/008* (2013.01); *C02F 1/441* (2013.01); *B01D 2313/502* (2022.08); *C02F 2103/44* (2013.01); *C02F 2209/40* (2013.01)

(58) Field of Classification Search
None
See application file for complete search history.

(56) References Cited

U.S. PATENT DOCUMENTS

| | | | |
|---|---|---|---|
| 3,856,676 A | 12/1974 | Grimme et al. | |
| 4,156,621 A | 5/1979 | Andrews et al. | |
| 4,626,346 A | 12/1986 | Hall | |
| 4,808,287 A | 2/1989 | Hark | |
| 5,006,234 A | 4/1991 | Menon et al. | |
| 5,122,265 A | 6/1992 | Mora et al. | |
| 5,160,430 A * | 11/1992 | Gasser | B01D 61/12 210/167.01 |
| 5,282,972 A | 2/1994 | Hanna et al. | |
| 5,413,128 A * | 5/1995 | Butts | B60S 3/04 134/123 |
| 5,503,735 A | 4/1996 | Vinas et al. | |
| 11,389,770 B2 | 7/2022 | Kalscheur et al. | |
| 2010/0206341 A1* | 8/2010 | Essenburg | B60S 3/04 134/45 |

(Continued)

FOREIGN PATENT DOCUMENTS

| | | |
|---|---|---|
| CA | 2352242 | 4/2001 |
| CA | 2400949 A1 | 9/2001 |
| CA | 2987016 A | 6/2015 |

OTHER PUBLICATIONS

Propak Spot Free Rinse Systems Installation and Operational System Manual, Huron Valley Sales, Inc, Copyright 2022, Belleville, MI, USA.

(Continued)

*Primary Examiner* — Cristi J Tate-Sims

(57) ABSTRACT

A Vehicle Wash Reverse Osmosis System is provided.

19 Claims, 8 Drawing Sheets

(56) References Cited

U.S. PATENT DOCUMENTS

2021/0339204 A1   11/2021   Kalscheur et al.

OTHER PUBLICATIONS

Spot Free Reverse Osmosis Rinse System, Tommy Carwash Systems, Version 1A, Copyright 2016, Holland MI, USA.
Spot Free Rinse System Manual, Purclean, Copyright 2010, North Highlands, CA, USA.

* cited by examiner

VEHICLE WASH REVERSE OSMOSIS SYSTEM

RELATED APPLICATIONS

This application claims the benefits of U.S. Provisional Patent Application No. 63/092,749, Carwash Reverse Osmosis System, by James Patrick Ordo, filed Oct. 16, 2020, the entire disclosure of which is expressly incorporated by reference herein.

TECHNICAL FIELD

The present disclosure generally relates to a vehicle wash reverse osmosis system. More particularly, the present disclosure relates to a reverse osmosis system designed to integrate into a conveyor style wash system.

BACKGROUND AND SUMMARY OF THE DISCLOSURE

This section introduces aspects that may help facilitate a better understanding of the disclosure. Accordingly, these statements are to be read in this light and are not to be understood as admissions about what is or is not prior art.

There are over 17,000 conveyor-type vehicle wash systems in the U.S. market. Vehicle wash systems utilize conveyors to transport vehicle through a sequence of wash processes designed to remove dirt and clean vehicle. These processes include pre-soak, high pressure spray, chemical application, cloth or wraps to mechanically clean the surface of the vehicle followed by a series of rinse steps and drying of the vehicle.

A reverse osmosis system is used to generate high purity rinse water to use as a final rinse process in the wash before drying. Reverse osmosis water is applied to the vehicle surface using a pump and spray nozzles before drying the vehicle. The reverse osmosis water has extremely low levels of dissolved solids and will evaporate from the surface without leaving spots. In washes without reverse osmosis rinse water, spots will form if any water droplets remain on the vehicle after the drying, process.

The usage of reverse osmosis water ranges from two to four gallons per vehicle. Vehicle washes volume in conveyor type washes range between 400 to over 2000 vehicles per day. Vehicles volume varies significantly throughout the day and some washes can clean over 200 vehicles per hour so the maximum reverse osmosis usage can be in excess of 600 gallons per hour.

According to the present disclosure, a vehicle wash reverse osmosis system is provided that includes a chlorine removal system, a reverse osmosis production pump, a reverse osmosis membrane or membranes, a tank for storage of the reverse osmosis water and a delivery pump to deliver the high purity water to the vehicles on the conveyor.

The system is integrated into a single skid and includes the ability to produce reverse osmosis fluid at a flow rate which allows a storage tank which is 100 gallons for a system that produces 10 gallons per minute of high quality water. In addition, the reverse osmosis system is designed to vary production of reverse osmosis flow into tank based on the demand for reverse osmosis water. Supplying osmosis water based on demand reduces the storage tank size, reduces the average power to generate the required reverse osmosis water and increases the membrane life.

BRIEF DESCRIPTION OF THE DRAWINGS

The previously described aspects of this disclosure will grow to be appreciated at a greater level once references to the following accompanying illustrations are expounded upon.

Revers osmosis system uses reverse osmosis membranes (sometimes referenced herein as a reverse osmosis filter) to create high purity reverse osmosis water. The system stores the water for use, then uses a delivery pump which communicates with one or more spray nozzles to deliver high purity water to the vehicle thereby providing a spot free rinse of the surface of the vehicle prior to entering the drying step of the wash process.

Figure 2:
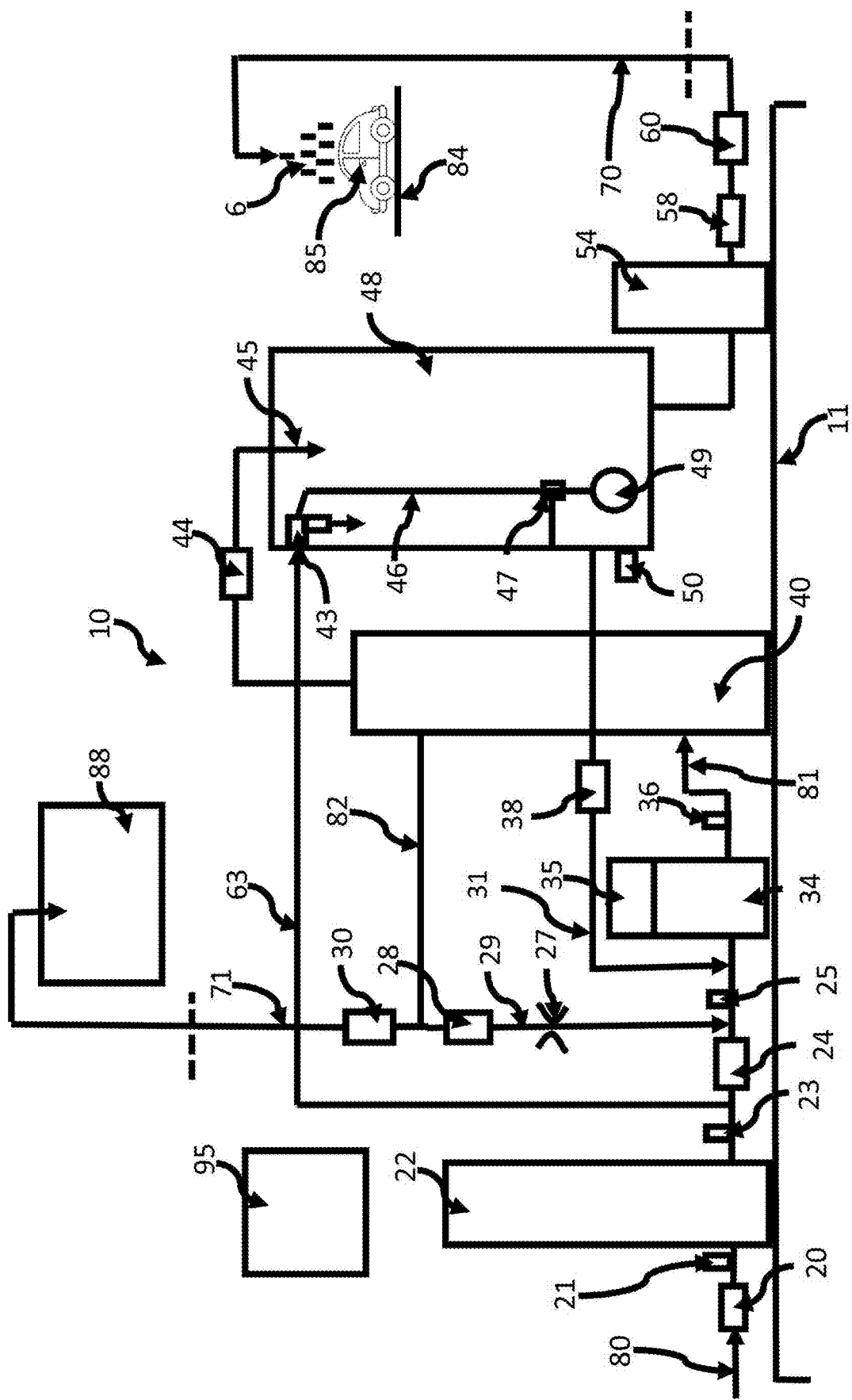

FIG. 2 is a diagram of a vehicle wash reverse osmosis system having a municipal water feed, a carbon block assembly, a variable speed reverse osmosis production pump, an reverse osmosis filter(s), a storage tank, a delivery pump and a series of valves controlled by a controller. The complete reverse osmosis production, storage and delivery system is integrated into a skid which allows simplified installation, service and replacement.

Figure 3B:
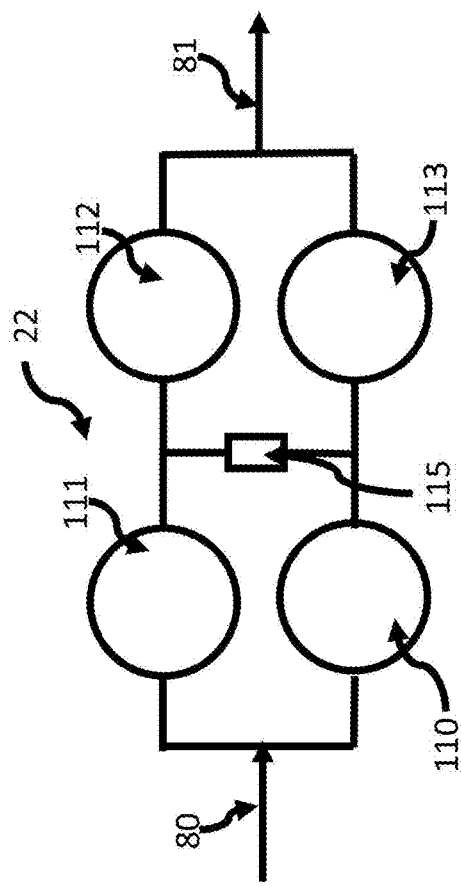
Figure 3A:
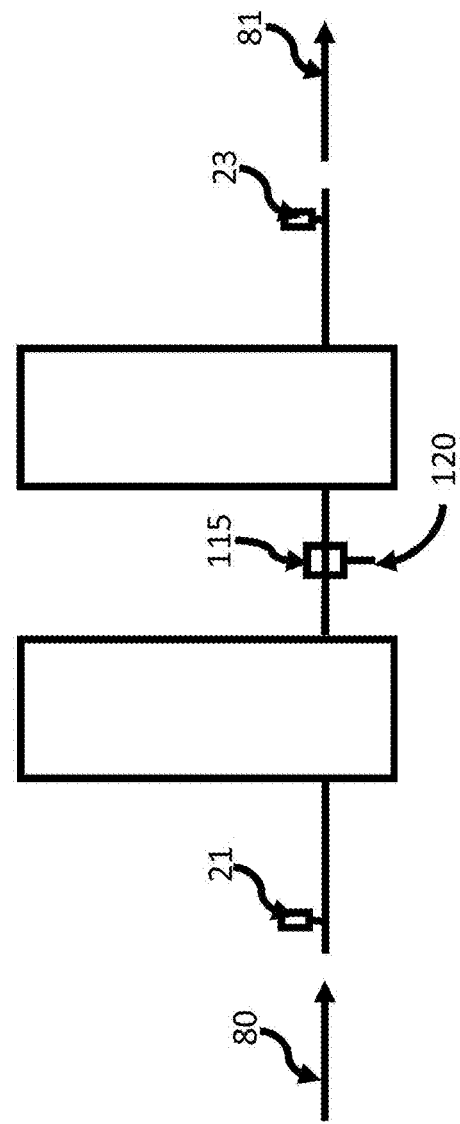

FIG. 3A, is a diagram of one embodiment of the carbon block assembly which removes chlorine and also provides a sediment filtering function. This device is made up of one of more housing(s) which hold one or more carbon blocks designed to provide both mechanical filtering and chlorine removal from the feed water supply, FIG. 3B is a top view of one embodiment of the carbon block assembly.

Figure 4B:
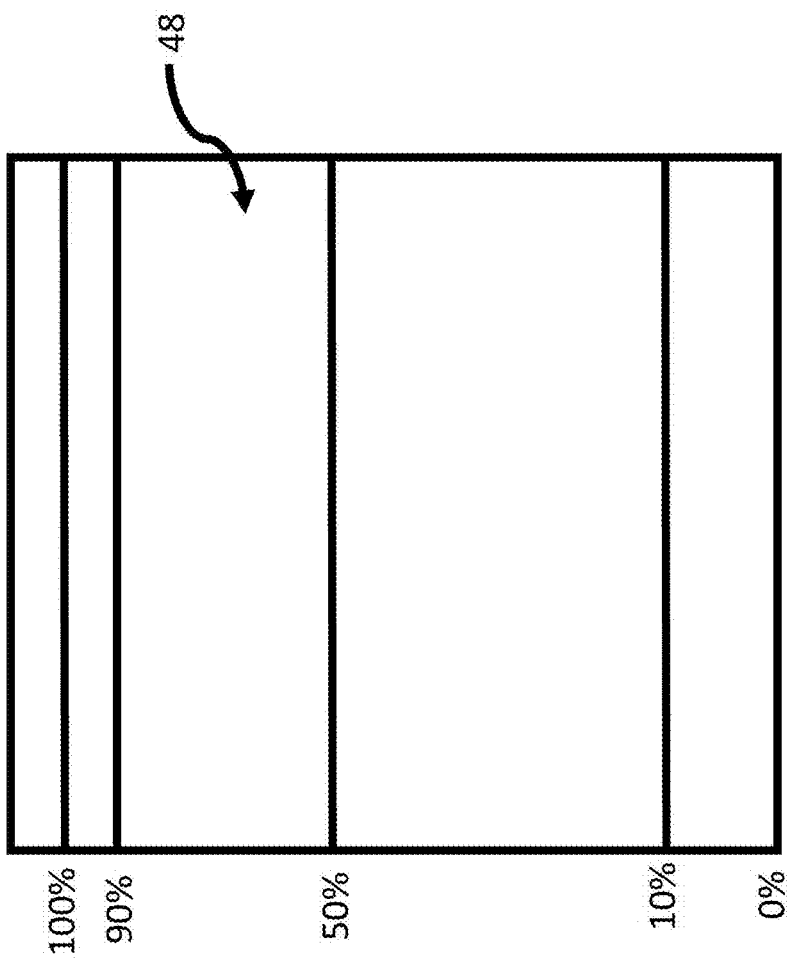
Figure 4A:
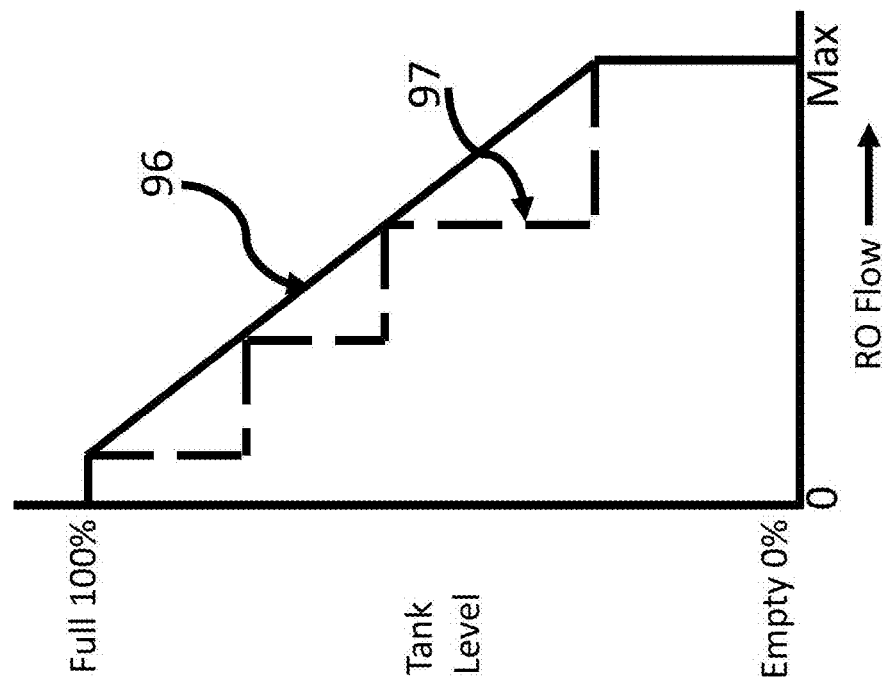

FIG. 4A is the flow vs tank level diagram which is used to adjust the requested flow from the reverse osmosis system. The diagram shows an embodiment of the control input using a level sensor located near the bottom of the storage tank. As the tank level drops, the s stem commands higher reverse osmosis flow from the system to maintain adequate quantity of reverse osmosis water to match the number of vehicles being washed.

FIG. 4B shows a diagram which explains how the controller automates the reverse osmosis production mode, membrane flush mode, and standby mode. Unit will stay in standby mode until tank level drops to a specified turn-on level, once this level is reached, the system will go back to the reverse osmosis production mode. Once tank is full, unit will perform a membrane flush cycle using the tanked high purity reverse osmosis water. Once completed the unit goes to standby mode until tunnel usage drops tank level hack to the Turn-on level. This process is automated and operates without operator inputs.

Figure 5:
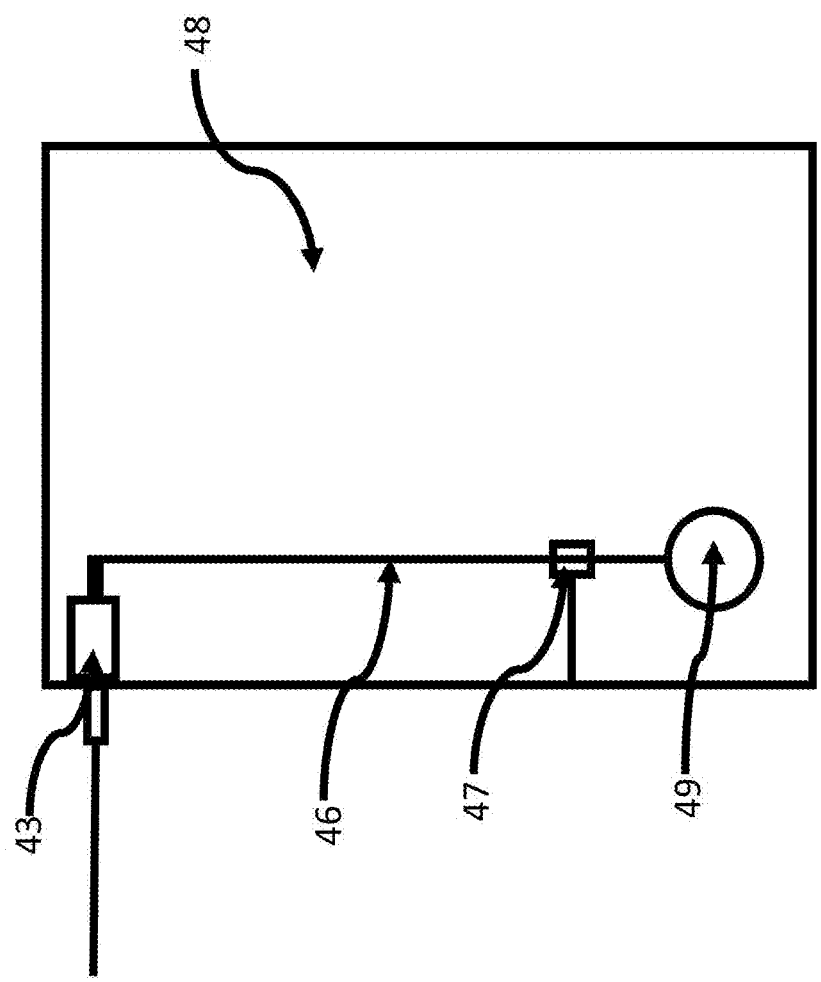

FIG. 5 is a cross-sectional view of the reverse osmosis tank which includes a back-up municipal float valve designed to prevent dry running of the delivery pump. The float drops as the tank level approaches empty and it allows feed water (with chlorine removed) to augment the reverse osmosis flow into the tank. This low tank float valve ensures that the delivery pump does not dry run which would damage the pump.

Figure 1:
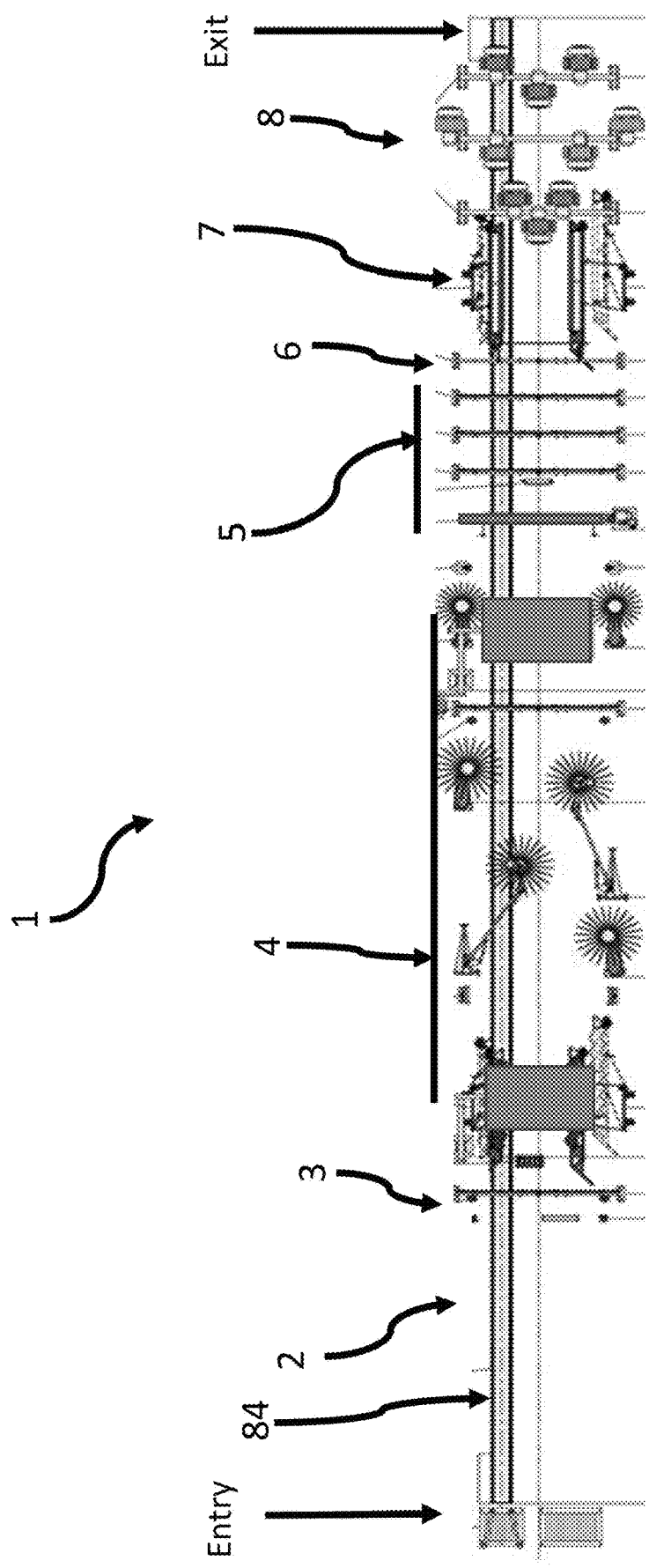
FIG. 1 is a diagram of a vehicle wash system, comprising: a plurality of nozzles configured to apply liquids to vehicles, a vehicle conveyor configured to advance vehicles past the plurality of nozzles a series of wash processes designed to apply chemicals, remove dirt front the surface of the vehicle, rinse dirt and chemicals from vehicle and dry the surface of the vehicle The vehicle reverse osmosis system described in this disclosure provides the final rinse step of the cleaning process.
Figure 6A:
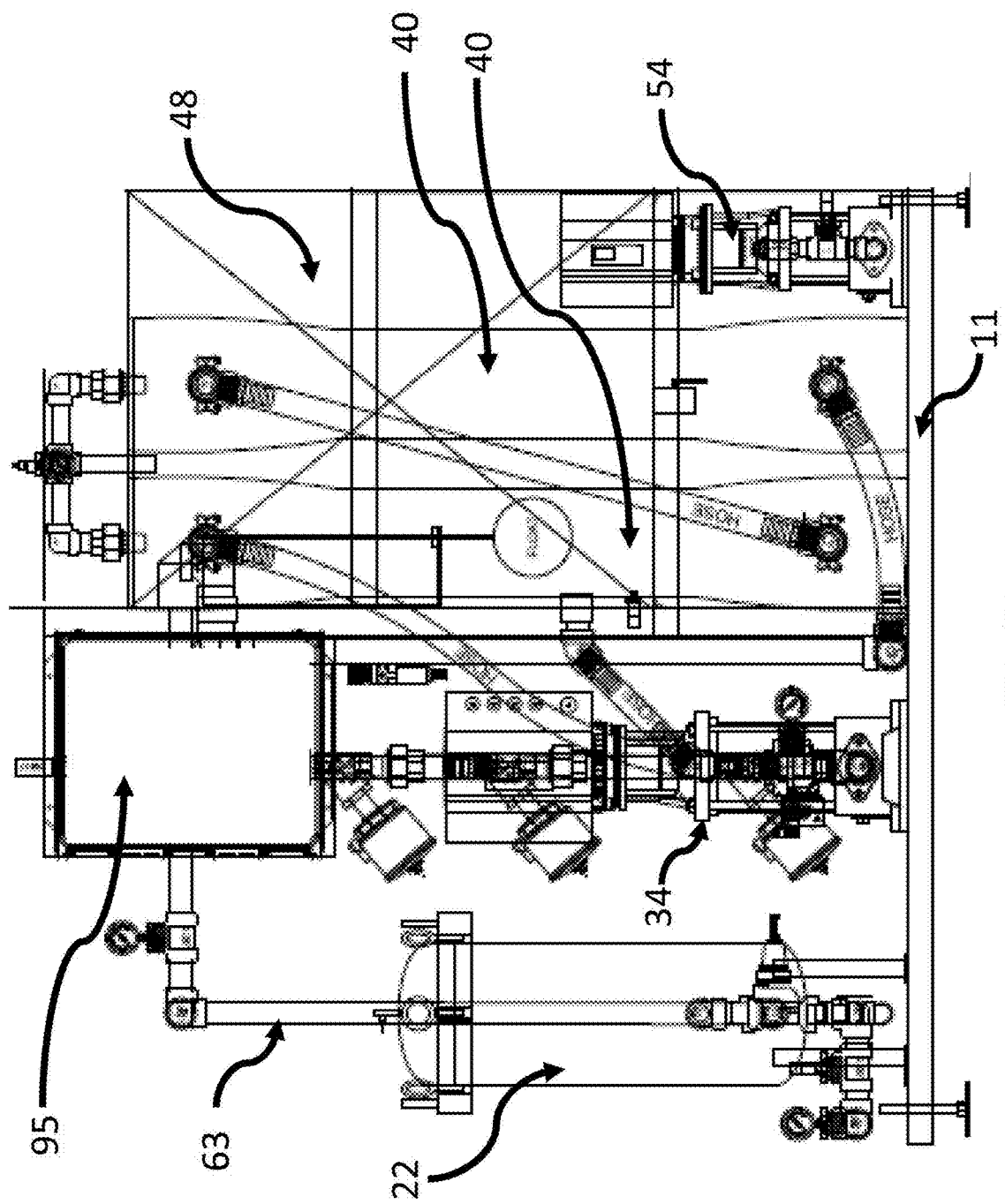

FIG. 6A is a drawing of one embodiment of the reverse osmosis system hardware integrated onto a skid. All of the elements of FIG. 1 are shown in the packaging drawings FIGS. 6A, 6B and 6C.

Figure 6B:
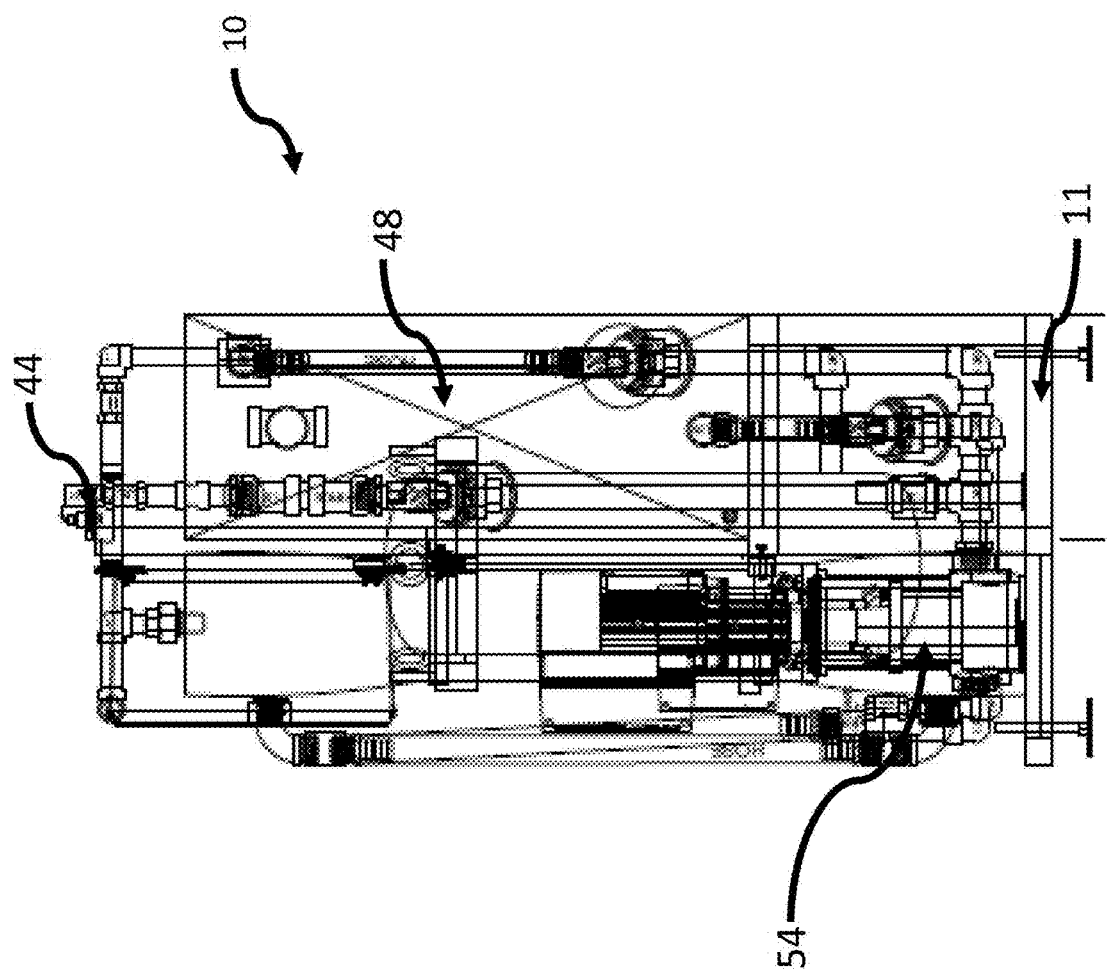

FIG. 6B shows a side or end view of the skid integration. Integration on a single skid provides simplified connections to the electrical and water supply systems in the wash.

Figure 6C:
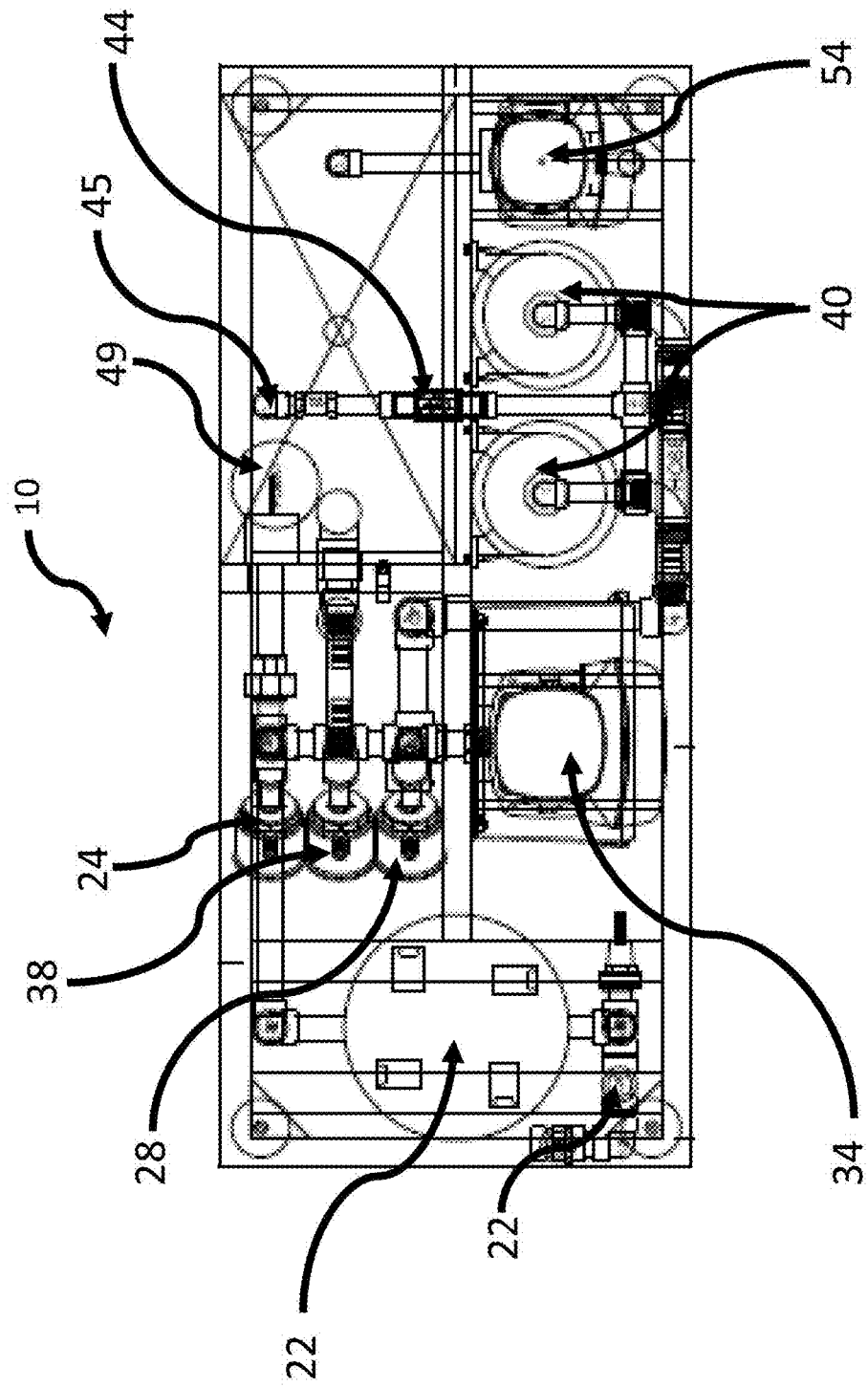

FIG. 6C show a top view of the skid. This view includes the orientation of the pumps, membranes, storage tanks and carbon block assembly onto the skid.

The embodiments disclosed below are not intended to be exhaustive or limit the disclosure to the precise form disclosed in the following detailed description. Rather, the embodiments are chosen and described so that others skilled in the art may utilize their teachings. Unless otherwise indicated, the components shown in the figures are shown proportional to each other. It will be understood that no limitation of the scope of the disclosure is thereby intended.

The disclosure includes any alterations and further modifications in she illustrative devices and described methods and further applications of the principles of the disclosure which would normally occur to one skilled in the art to which the disclosure relates.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. Additional details of a suitable vehicle wash system are provided in U.S. patent application Ser. No. 17/244,360, filed Apr. 29, 2021, by James Patrick Ordo, tided Vehicle Wash System, the entire disclosure of which is expressly incorporated by reference herein.

Reverse osmosis systems produce high purity water which is applied to the vehicle at the final rinse process before drying. In general, a vehicle wash process comprising: a plurality of nozzles configured to apply liquids to vehicles, a vehicle conveyor configured to advance vehicles past the plurality of nozzles, a series of wash processes designed apply chemicals, remove dirt from the surface of the vehicle, rinse dirt and chemicals from vehicle and dry the surface of the vehicle.

FIG. 1 shows one embodiment of a vehicle wash 1 comprising an entry to conveyor 84, tire chemical/pre-soak 2, soap application through spray nozzles 3, brushes and cloth wraps 4 used to provide friction cleaning, a series of rinse processes 5, a final rinse with reverse osmosis water 6, a tire shine chemical application 7, one or more dryers 8, and a conveyor exit. Vehicle wash conveyors include belt and chain type conveyors and range in length from less than 40 feet to over 200 feet, Typical conveyor speeds allows for wash volumes from 60 to over 200 cars per hour.

As shown in FIG. 2, reverse osmosis water 45 which is delivered to vehicle 85 as the final rinse step 6 is produced by reverse osmosis system 10 described in this disclosure. This reverse osmosis rinse process is a critical step in cleaning the vehicle to prevent water spots from forming on the vehicle during the drying process 8.

Reverse osmosis system 10 described in this disclosure provides the final rinse step of the cleaning process. Reverse osmosis system 10 creates the high purity reverse osmosis water 45 using reverse osmosis membranes filters 40, stores the water for use as requested in tank 48, then uses delivery pump 34 which communicates with one or more spray nozzles 6 to deliver the high purity water to the vehicle to provide a spot free rinse of the surface of the vehicle prior to entering drying process 8.

FIG. 2 shows details of a vehicle wash reverse osmosis system 10 which generates reverse osmosis water 45 for spot free rinsing vehicle 85 during the wash process 1. This system includes a water source 80, a pressure regulator 20, a carbon block assembly 22, a reverse osmosis production pump 34, one or more reverse osmosis membranes filters 40, a reverse osmosis storage tank 48, a delivery pump 54, a series of valves 24, 28, 38, 60, a controller 95 to automate the system and a skid 11 to allow all the components to be mounted on a single skid.

Operation of the reverse osmosis system consists of four modes of operation. These include 1) reverse osmosis production mode, 2) membrane flush, 3) standby mode and 4) reverse osmosis delivery mode to vehicle wash system 1.

The first mode is the reverse osmosis production mode, where municipal feed water 80 flows through a pressure regulator 20 which generates a consistent feed water pressure. Then water flows through carbon block assembly 22 which removes both sediment and chlorine from feed water 80.

Feedwater 80 with chlorine removed proceeds to the inlet of the reverse osmosis production pump 34. Reverse osmosis production pump 34 is a variable speed pump. It has a variable speed drive 35 which can be integrated on pump 34 or located in controller 95 or somewhere else on the stand. Production pump 34 combines with variable speed drive 35 allows controller 95 to vary reverse osmosis production pump 34 speed thereby increasing or decreasing flow 81 to reverse osmosis membrane(s) 40.

This feed water flow 81 enters membrane(s) 40 and a portion of water flow 81 moves through the reverse osmosis membrane/filters 40 to produce high purity reverse osmosis water 45. The reverse osmosis process occurs as the feed water 81 is pressurized and high purity water flows through membranes 40. The remaining water, which does not pass through the reverse osmosis membrane(s) 40, increases in dissolved solids and becomes concentrated water 82 (also referred to as concentrate). Concentrated water 82 flow splits into a recirculating flow 29 which returns back to the inlet side of reverse osmosis pump 34 and reverse osmosis reject flow 71 which is communicated through flow orifice 30 to reject tank 88.

Reject flow 71 is concentrated water 82 which has dissolved solids higher than feed water 80. Reject flow 71 water can be re-used for other wash applications which can utilize lower purity water. Reverse osmosis reject flow orifice 30 is sized to achieve a recovery rate of 50% or higher. The recovery rate is the percentage of the feed water which becomes high purity water. A recovery rate of 50% means 50% of the feed water is turned into high purity reverse osmosis water.

Recirculation flow 29 includes an orifice 27 in the flow path which creates a pressure drop needed to create higher production pump 34 pressure required for the membrane(s) 40 to generate reverse osmosis water 45. The reverse osmosis flow through the membranes 40 requires a pressure differential between the concentrate water side and the high purity water side. Recirculation flow path 29 includes orifice 27 which creates a higher pressure on concentrated water side of the membrane needed to generate requested reverse osmosis flow.

In order to turn on the reverse osmosis production mode, requires the controller 95 to open solenoid valves 24 and 28.

Controller 95 controls reverse osmosis pump 34 speed using an automated flow control loop using reverse osmosis flow sensor 44 to feedback reverse osmosis flow 45 to storage tank 48. This signal is used by the controller 95 to generate a command for increasing or decreasing the pump speed to achieve the commanded reverse osmosis flow 45. By using controller 95 to adjust the pump speed, this process is fully automated and there are no adjustments required by the operator. Eliminating adjustments ensures consistent flow rate, and protects the membrane from damage created by high dissolved solids in the concentrate water side of the membranes 40.

Tank level sensor 50 is used to communicate the reverse osmosis storage tank 48 liquid level to controller 95 and is used to adjust the commanded reverse osmosis production flow rates based on storage tank 48 level. Controller 95 automatically requests flow increases as the tank level is lowered and deceases flow request as the tank 48 level increases.

This allows the system to produce reverse osmosis flow at varying rates based on the flow being used in the wash system 1 to rinse vehicles. The flow rate can vary from 3 gallons per minute to over 10 gallons per minute. This ability to vary flow rates allows for a plurality of flow rate greater than one and allows system to be optimized for overall operational efficiency.

The municipal water source pressure reduces the reverse osmosis pump power required to generate these lower flows and aids in improving the overall system efficiency. Therefore, pump 34 power is significantly rec uced at lower flow rates and therefore energy usage per gallon of reverse osmosis production is further reduced. In addition, adjustment of flow based on demand improves the life of membranes 40 by reducing the flow rate throuh g each square meter of membrane material. The calculation of flow rate net membrane area is known as the membrane flux. At lower membrane flux values reduces the tendency for the membranes to foul.

In addition, the tank level signal is used to turn the reverse osmosis production pump on and off. The turn-on and turn-off levels are controller by controller 95 to ensure the system operates at high efficiency and minimum pumping power is required to match requested demand.

For a given water temperature, reverse osmosis membrane(s) 40 flow 45 will increase as reverse osmosis pump pressure 34 increases the pressure in flow path 81. The reverse osmosis system 10 is designed to produce a peak flow of over 10 gallons per minute of reverse osmosis water needed to apply approximately 3 gallons of revers osmosis water per vehicle at a maximum rate of over 200 vehicles per hour.

The minimum system flow is selectable by the operator, and is set to 3 gallons per minute. However, according to alternative embodiments, the system could produce between 2 and 15 gallons of reverse osmosis water per minute. Usage per vehicle could range from 2 to over 5 gallons per vehicle which would generate adequate reverse osmosis rinse water for between twenty-four and four hundred fifty vehicles per hour through the vehicle wash tunnel.

Controller 95, uses a control algorithm which uses reverse osmosis flow sensor 44 output to adjust reverse osmosis pump 34 operating speed which generates reverse osmosis flow 45 automatically. This control approach automatically compensates for changes in feed water 80 temperature, changes in the feed water quality over time and also compensates for membrane(s) 40 degradation over the life of the membrane.

A pressure sensor 36 is installed in the discharge side of reverse osmosis pump 34 and is used to limit reverse osmosis pump pressure to a maximum value. This pressure value can be adjusted by the operator to account for different membranes 40 characteristics.

When operating in reverse osmosis production mode, the unit will produce reverse osmosis until reverse osmosis tank 48 is full and then reverse osmosis pump 34 will shut off, controller 95 will closed valves 24, 29 and system 10 will transition to flush mode.

During flush mode, controller 95 will configure the valves to flush mode by opening valve 38 which allows high purity water from reverse osmosis tank 48 to flow water through path 31 to inlet of reverse osmosis pump 34. Reverse osmosis pump 34 is commanded to operate at low speed for a fixed time to flush reverse osmosis membrane(s) 40 with high purity reverse osmosis water 45. Once the flush is completed, reverse osmosis production pump 34 will shut off.

In this standby mode, reverse osmosis tank 48 is nearly full, pump 34 is off and valves 24, 28 and 38 are closed and reverse osmosis system 10 will automatically remain in this standby mode until reverse osmosis tank 48 level drops to the pump turn-on level. This occurs as tank level drops as vehicle are washed in the tunnel and delivery pump 54 delivers reverse osmosis water 45 from reverse osmosis tank 48.

Delivery pump 54 operates independently of the reverse osmosis production process and operates whenever a demand signal is received from the tunnel controller to deliver reverse osmosis water for a vehicle on the conveyor. The mode is called the repressurization or delivery mode. Upon request, reverse osmosis water 45 in tank 48 is communicated to inlet side of delivery pump 54. Upon receiving a tunnel demand signal for reverse osmosis rinse water, solenoid 60 opens, delivery pump 54 is turned on and reverse osmosis water is delivered to the car in tunnel through spray nozzles 6 to rinse vehicle 85 on conveyor 84.

The reverse osmosis storage tank 48 is sized based on the maximum reverse osmosis production rate. This system uses a 100 gallon tank for a 10 gallon per minute maximum reverse osmosis production flow rate. This creates a ratio of tank volume to flow rate ratio of 10. According to alternative embodiments this tank size could be 25, 50, 100, 200 or 300 gallons with tank volume to flow rate ratios have corresponding values of 2.5, 5, 10, 20 or 30. In other embodiments, the maximum flow rate can also be increased or decreased which would impact this ratio. For a given maximum flow rate, a larger ratio indicates a larger tank size. Smaller tanks are more easily integrated to the system, reduce both build and installation costs and reduce maintenance expense. In addition, the integrated skid allows for complete testing of the system at the manufacturing site and reduces the cost of installation into the wash.

In this embodiment, the flow rate per car is 3 gallons per minute and maximum flow the reverse osmosis unit can generate is approximately 600 gallons per hour or enough water to rinse 200 cars per hour. Storage tank 48 is 100 gallons. The ratio of cars cleaned per hour vs tank size is 200 cars per hour using a 100 gallon tank. This creates a ratio of 2.0 cars per hour per gallon of tank size. According to alternative embodiments using varying size tanks described in paragraph 47, this range could range from 0.66 to 8 cars per hour per gallon of tank storage. Ratios greater than 0.66 will reduce tank size and allows unit to be integrated on a single skid.

Reverse osmosis system 10 includes a series of diagnostic signals and maintenance data which allow operator to diagnose the system through use of data stored in the controller 95. This data allows operator to perform predictive maintenance on the system before the system stops producing reverse osmosis water.

In addition, the controller 95 can generate communications to allow monitoring of equipment remotely to support preventive maintenance actions or diagnose failures.

The system incorporates features to protect the pumps 34,54 from drying running, verify adequate flow through membranes 40 and measure pressure drop across carbon block assembly 22.

Flow switch 58 is used to verify that solenoid 60 opened and delivery pump 54 turned on and water is flowing to the tunnel, Flow switch 42 is used to verify adequate concentrated water flow 82 during reverse osmosis production operation. Failure of this switch to close indicates that a failure of recirculation valve 28 to open or reject orifice 30 is clogged or orifice 27 in the recirculation line is clogged with debris.

Pressure switch 25 ensures that reverse osmosis production pump 34 inlet is supplied with adequate supply of feed water 80 pressure to protect production pump 34 from dry running or cavitation during operation.

Pressure transducers 21 and 23 are used to calculate pressure drop across carbon block assembly 22. The pressure drop can be used to determine when the carbon blocks are becoming clogged by sediment.

Pressure transducer 36 provides a pressure signal hack to the controller 95 which limits reverse osmosis production pump 34 pressure. This pressure set point is adjustable to accommodate different membrane flow characteristics.

Accordingly to alternative embodiments, the diagnostics could utilize alternative signals or locations within the flow paths to achieve additional diagnostics and prognostic capability to protect critical components of the system 10.

FIG. 3A shows one embodiment of a carbon block filtration system assembly 22 which uses four carbon blocks arranged in a parallel series arrangement to form a two stage chlorine removal filter. Blocks 110 and 111 form the first stage of the filter and blocks 112 and 113 form the second filter stage. Between the two stages is a sampling valve 115 which is used to measure the free chlorine in the feed water after the first stage 120. The two stage approach provides a secondary level of protection for membranes 40 to prevent chlorine breakthrough which could quickly damage reverse osmosis membranes 40.

FIG. 3B shows a top view of the carbon block assembly 22 and illustrates the parallel flow during the first stage and the series flow to the second stage carbon blocks.

Chlorine in the municipal water can quickly damage membranes 40, chlorine levels over 0.1 parts per million rapidly damage the membrane and allow dissolved solids to pass through the membrane 40. This reduces the purity of the reverse osmosis water which will cause spots to form on cars during the drying process. In order to prevent this damage, it is critical that all free chlorine is removed from the feed water.

Carbon filter assembly 22 includes pressure sensors 21 and 23 to measure the inlet and outlet pressure to allow measurement of differential pressure across carbon block filter during operation. Differential pressure is used as a diagnostic to help operator know when to replace carbon blocks 110, 111. Secondary carbon blocks 112, 113 provide additional protection as operators may fail to test the free chlorine level on a daily basis and second stage blocks 112, 113 protect the reverse osmosis system 10 from chlorine breakthrough and failure of membranes 40.

Carbon blocks 22 do not require backflushing which reduces overall water usage. In addition, carbon blocks are easy to remove and replace when maintenance is required.

According to an alternative embodiments of this invention could utilize a single tank with one or more carbon blocks or a system with one or more carbon blocks arranged it a series or parallel arrangement. Another alternate embodiment would replace the carbon block assembly 22 with a conventional carbon media tank style filter and add a sediment filter to remove chlorine from the municipal water.

FIG. 4A shows how the commanded reverse osmosis flow rate varies based on the tank level. Starting with an empty reverse osmosis tank 48, the reverse osmosis flow rate will command high reverse osmosis flow until the level reaches a determined level. As the tank level increases, the commanded rate of reverse osmosis production is reduced. This allows system to compensate for lower or higher vehicle volumes in the tunnel by adjusting flow 45 to match the demand for reverse osmosis water from the tunnel vehicle volume. Controller 95 controls this variable commanded flow based on the tank level, the unit only produces the required reverse osmosis quantity for the volume of vehicles being washed in the wash system 1. This control approach enables 1) a reduction in storage tank size by increasing reverse osmosis flow as the demand increases, 2) allowing the pump 34 to operate at lower power levels when the vehicle volume is low by reducing the pump speed, 3) reducing the total number of on/off and flush cycles of the reverse osmosis production pump 34 and 4) improved membrane 40 life. This approach allows the system to use a smaller tank with a capacity to rinse 20 to 30 cars as a buffer. This buffer allows time for the system to adjust the flow rate and allows for short term surges in wash volume.

Additionally, the controller 95 allows operator to program the commanded reverse osmosis production vs tank level to meet specific flow requirements based on maximum vehicle volume and amount of reverse osmosis actually delivered to each vehicle. By adjusting flow based on the tunnel demand, the reverse osmosis system 10 has the ability to run continuously and supply reverse osmosis for varying volumes of vehicles in the tunnel. When usage is 3 gallons per vehicle, varying reverse osmosis production 45 flow between 3 to 10 gallons per minute allows unit to run continuously whenever vehicles are being washed at rates of 60 to 200 vehicles per hour. At vehicle wash rates below 60 vehicles per hour, the storage tank level will be increasing until it reaches the full condition and initiates a flush cycle. Operating at these lower flow rates increase membrane life, in addition, using reverse osmosis water to flush membrane 40 increases the life of the membrane betbre removal for cleaning or replacement is required. The preferred embodiment provides for the flow command shown in curve 96 although an alternative embodiments could consist of steps as shown by curve 97 or other type of curve to flow rate vs tank 48 level.

Alternative embodiments could monitor vehicles entering the wash as an alternative or in addition to the tank level signal to establish the reverse osmosis production flow demand signal. These alternative approaches could be used to determine a predictive demand algorithm which anticipates demands and adjust flow to reduce high flow rates and improve the overall system efficiency by measuring vehicle demand earlier in the wash cycle. This approach would allow reverse osmosis production based on an average demand and reduce the amount of high flow demand.

FIG. 4B is used to illustrate one embodiment of how the controller 95 using inputs from the tank level sensor 50 controls the unit. Starting with an empty tank 0%, reverse osmosis system will turn on and produce water per the curve 96 shown in FIG. 4A. As the tank fills, demanded flow is reduced until the tank reaches full 100%, at that point, the reverse osmosis production mode is turned off and the flush mode begins. Once the flush cycle is completed, the tank level will be approximately 90% of full, at this point the flush cycle is completed and the unit will go to standby mode until the tank level drops as vehicles come through the wash and reverse osmosis water is sprayed to provide rinse water to vehicles. When the tank level reaches level 50% or other level set by the controller, the unit will start reverse osmosis production again to generate more reverse osmosis water 45. This cycle repeats during the entire day of wash operation.

After each cycle there is a flush cycle which ensures the membranes are always surrounded by high purity reverse osmosis water when the unit is not in the production mode. This use of reverse osmosis water for the flush cycle extends the life of the membranes by removing mineral deposits on the membrane(s). Using high purity water to flush the membranes 40, pulls the minerals from the membrane surface and back into solution. This approach leads to increased membrane 40 life and prevents membrane fouling or build-up of minerals or other solids on the surface or in the membrane material.

FIG. 5 shows one embodiment of vehicle wash reverse osmosis system tank 48 which includes a back-up supply of municipal water to ensure the reverse osmosis tank always has adequate water to supply delivery pump 54.

The back-up system utilizes a feed water line 63 after the carbon block assembly 22, but before solenoid valve 24, to supply additional water when the tank approaches an empty level of <10%. If tank level drops to this level, this water, which has the chlorine removed is mixed with the reverse osmosis water to ensure adequate water is available to supply the delivery pump 54 demand for rinsing vehicle. Because the chlorine has been removed, the water will not damage the membranes when used as a portion of the flush cycle water. Float 49 is located toward the bottom of tank 48 and as the level drops, the float drops which pulls rod 46 supported with bushing 47 to open water valve 43.

This back-up float valve system ensures water is supplied to the delivery pump 54 if the reverse osmosis pump fails or the membranes 40 are damaged and cannot supply an adequate quantity of reverse osmosis water 45 needed to rinse the vehicles. This back-up feature along with flow switch 58 provides additional protection to avoid dry running of the delivery pump 54 leading to pump damage or overheating.

According to alternative embodiments, this back-up system could be configured using a conventional control valve operated by tank level sensor 44 and controller 95 if desired.

FIG. 6A shows one embodiment of the front view of an integrated reverse osmosis system 10 which includes the skid 11. This system includes all the components and sub-systems for the vehicle wash reverse osmosis 10 unit including the controller 95. Integration into a single skid 11 package reduces installation effort and cost of installing separate storage tank(s) remote to the unit which require additional space, and additional plumbing connections. The integrated skid reduces system tbotprint requiring less space in the wash, allows full system testing and leak checking of wiring and plumbing at the manufacturing site before shipping, and supports reduction in installation cost, improved serviceability and reduced maintenance.

This embodiment shows a unit with two membranes housings; however, this system is designed to utilize one or more membranes. The number and size of membranes will determine the maximum reverse osmosis production rate. This embodiment also shows a single carbon block assembly 22, which holds multiple carbon blocks.

FIG. 6B shows an end view of the embodiment shown in FIG. 5A. This view glows how the tank is installed on skid 11.

FIG. 6C shows a top view of the embodiment shown in FIG. 5A. This view shows the major component locations on skid 11. These components include a single carbon block assembly 22, holding multiple carbon blocks, production pump 34, delivery pump 54, membranes 40, and tank 48.

According to one embodiment, the controller 95 includes maintenance screens to log operational data supplied by at least one sensor 44 and two pressure sensors 50, 36 used to control the system. Maintenance screens may display readings supplied by other sensors, measure on/off cycles, pump operating hours, system faults, including but not limited to low membrane flow, no flush, motor temperature faults, etc. According to alternative embodiments, readings displayed by maintenance screens may use remote connection capability to allow scheduling of maintenance actions remotely. In addition, the controller 95 can interface with a touch screen to allow operator to interact with a simple intuitive interface. This also facilitates complete tracking of operation with date stamps and diagnostic codes to provide a full history of the unit's operation.

Those having ordinary skill in the art will recognize that numerous modifications can be made to the specific implementations described above. The implementations should not be limited to the particular limitations described. Other implementations may be possible.

We claim:
1. A vehicle wash system comprising:
   a vehicle conveyor configured to advance vehicles,
   a plurality of nozzles configured to apply liquids to vehicles advanced past the plurality of nozzles by the vehicle conveyor, and
   a rinse system including
      a reverse osmosis filter,
      a tank in fluid communication with the reverse osmosis filter to receive water filtered by the reverse osmosis filter, and
      a controller configured to control the flow of water through the reverse osmosis filter to produce reverse osmosis flow at varying rates based on the flow being used in the vehicle wash system to rinse vehicles.
2. The vehicle wash system of claim 1, wherein the reverse osmosis storage tank has a maximum volume, and the rinse system has a maximum production flow rate, a ratio of the maximum volume to the maximum production flow rate being less than 30 minutes.
3. The vehicle wash system of claim 1, further comprising at least one of a proportional tank level sensor and a non-binary tank level sensor in communication with the controller.
4. The vehicle wash system of claim 1, further comprising a valve supplying municipal water to the plurality of nozzles in response to the controller detecting the tank being below a predetermined level.
5. A vehicle system comprising:
   a vehicle conveyor configured to advance vehicles at a vehicle rate, a plurality of nozzles configured to apply liquids to vehicles advanced past the plurality of nozzles by the conveyor, and a rinse system including a reverse osmosis filter having a maximum flow rate of filtered water, and a reverse osmosis storage tank in fluid communication with the reverse osmosis filter to receive filtered water filtered by the reverse osmosis filter, the reverse osmosis storage tank having a maximum volume, a ratio of the maximum volume to the maximum flow rate of filtered water of less than 30 minutes.

6. The vehicle wash system of claim 5, further comprising a skid frame, wherein the rinse system is supported on the skid frame.

7. The vehicle wash system of claim 5, wherein the reverse osmosis filter has a current flow rate, the current flow rate being dependent to the vehicle rate.

8. The vehicle wash system of claim 5, wherein the reverse osmosis filter has a current flow rate, the storage tank has a current volume, and the current flow rate is dependent on the current volume.

9. The vehicle wash system of claim 5, further comprising a controller configured to control the flow of water through the reverse osmosis filter at a plurality of positive flow rates based on the volume of filtered water in the tank.

10. The vehicle wash system of claim 5, further comprising a valve supplying municipal water to the plurality of nozzles in response to the controller detecting the tank being below a predetermined level.

11. A vehicle wash system comprising:

a vehicle conveyor configured to advance vehicles at a vehicle rate, a plurality of nozzles configured to apply liquids to vehicles advancing past the plurality of nozzles by the vehicle conveyor, and a rinse system including a reverse osmosis filter, and a reverse osmosis storage tank in fluid communication with the reverse osmosis filter to receive filtered water filtered by the reverse osmosis filter, the reverse osmosis storage tank having a volume, a ratio of the vehicle rate to tank volume being greater than about 0.66 vehicles/hour/gallon.

12. The vehicle wash system of claim 11, further comprising a skid frame, wherein the rinse system is supported on the skid frame.

13. The vehicle wash system of claim 11, further comprising a valve supplying municipal water to the plurality of nozzles in response to the controller detecting tank below a predetermined level.

14. The vehicle wash system of claim 11, further comprising a controller configured to control the flow of water through the reverse osmosis filter at a plurality of flow rates.

15. A vehicle wash system, comprising:

a vehicle conveyor configured to advance vehicles, a plurality of nozzles configured to apply liquids to vehicles advanced past the plurality of nozzles by the vehicle conveyor, and a skid including a skid frame, and a rinse system including a reverse osmosis filter supported by the skid frame, and a tank supported by the skid frame, the tank being in fluid communication with the reverse osmosis filter to receive filtered water filtered by the reverse osmosis filter, wherein the rinse system includes a variable frequency drive pump providing water to the tank.

16. The vehicle wash system of claim 15, wherein the maximum volume of the tank is less than about 300 gallons.

17. The vehicle wash system of claim 15, further comprising a valve supplying municipal water to the plurality of nozzles in response to the controller detecting the tank being below a predetermined level.

18. The vehicle wash system of claim 15, wherein the reverse osmosis system has a flush mode, the flush mode using the reverse osmosis production pump to flush the reverse osmosis filter.

19. The vehicle wash system of claim 15, further comprising a controller configured to control the flow of water through the reverse osmosis filter at a plurality of positive flow rates based on the volume of the filtered water in the tank.

* * * * *